(12) United States Patent
van der Lely et al.

(10) Patent No.: US 6,463,876 B2
(45) Date of Patent: Oct. 15, 2002

(54) CONSTRUCTION FOR AUTOMATICALLY MILKING ANIMALS

(75) Inventors: Alexander van der Lely, Rotterdam; Karel van den Berg, Bleskensgraaf; Renatus Ignatius Josephus Fransen, Vlaardingen, all of (NL)

(73) Assignee: Lely Research Holding A.G., Zug (CH)

( * ) Notice: Subject to any disclaimer, the term of this patent is extended or adjusted under 35 U.S.C. 154(b) by 0 days.

(21) Appl. No.: 09/899,859

(22) Filed: Jul. 9, 2001

(65) Prior Publication Data

US 2002/0002952 A1 Jan. 10, 2002

(30) Foreign Application Priority Data

Jul. 10, 2000 (NL) .............................................. 1015672

(51) Int. Cl.$^7$ ................................................ A01J 5/017
(52) U.S. Cl. ................................ 119/14.01; 119/14.02; 119/14.08; 472/130
(58) Field of Search ................ 119/14.01, 14.02–14.08, 119/14.18; 472/48, 130

(56) References Cited

U.S. PATENT DOCUMENTS

| | | | | |
|---|---|---|---|---|
| 4,941,433 A | * | 7/1990 | Hanauer ................... | 119/14.02 |
| 5,020,477 A | * | 6/1991 | Dessing et al. .......... | 119/14.08 |
| 5,056,466 A | * | 10/1991 | Dessing et al. ................ | 119/28 |
| 5,379,721 A | * | 1/1995 | Dessing et al. .......... | 119/14.08 |
| 5,479,876 A | * | 1/1996 | Street et al. ............. | 119/14.08 |
| 5,511,979 A | * | 4/1996 | Perfect et al. ................ | 434/58 |
| 5,706,758 A | * | 1/1998 | Street et al. ............. | 119/14.08 |
| 5,918,566 A | * | 7/1999 | van der Berg ........... | 119/14.08 |
| 5,967,081 A | * | 10/1999 | Street et al. ............. | 119/14.08 |
| 6,148,766 A | * | 11/2000 | van der Lely ........... | 119/14.08 |
| 6,213,051 B1 | * | 4/2001 | Fransen ................... | 119/14.08 |
| 6,269,766 B1 | * | 8/2001 | Birk .......................... | 119/14.1 |
| 6,386,141 B1 | * | 5/2002 | Forsen et al. ............ | 119/14.08 |

* cited by examiner

*Primary Examiner*—Charles T. Jordan
*Assistant Examiner*—Bret Hayes
(74) *Attorney, Agent, or Firm*—Penrose Lucas Albright

(57) ABSTRACT

An apparatus for automated milking of animals which comprises a milking compartment and a milking robot that is provided with teat cups and a mechanism for connecting the teat cups to the animals being milking in milking compartment. A carrier element for the teat cups is disclosed which is movable in three dimensions while being supported and moved by three sets of controlled piston and cylinder elements, each set of said elements having one end on ends thereof connected to the milking compartment and the other end thereof connected to the carrier element, the connections to the carrier element (as seen in plan) not being aligned. Each set of controlled piston and cylinder elements consists of two controlled piston and elements which are in "V" configurations so that there are three non-aligned connections of each set to the carrier element and six non-aligned connections to the milking compartment.

21 Claims, 1 Drawing Sheet

CONSTRUCTION FOR AUTOMATICALLY MILKING ANIMALS

FIELD OF THE INVENTION

This invention relates to an apparatus for automatically milking animals which comprises a milking compartment which has a robotic milking machine that is movable via a linkage from the milking compartment to under an animal being milked to attach teat cups thereto and to withdraw teat cups upon termination of the milking process.

BACKGROUND OF THE INVENTION

Such an apparatus whereby a controllable robot arm is employed for positioning or connecting the teat cups or doing both as well as to disconnect and withdraw the teat cups. Such a robot arm comprises a first controlled element, at the end of which there is further provided a further controlled element, and at the end of the further controlled element there may be provided another controlled element. In other words two or three controlled units are connected in series. This has, inter alia, the disadvantage that an error in controlling the first controlled unit affects the control of the further control units, and additionally that of the third controlled unit if one is provided. Errors in control consequently accumulate and reinforce each other.

SUMMARY OF THE INVENTION

It is an object of the invention to improve the controlled interconnecting linkage between the milking compartment and the robotic milking machine where it connects to the teat cups to the teats of an animal being milked. According to the invention this is achieved by disposing the teat cups on a carrier element so that it is movable in three dimensions by at least three controlled piston and cylinder elements which each separately interconnects the carrier element with the milking compartment. The three controlled piston and cylinder elements each have one end fastened to the milk compartment, so that an accurate and reliable control is achieved.

BRIEF DESCRIPTION OF THE DRAWINGS

The invention will be explained in further detail with reference to the accompanying figures.

BRIEF DESCRIPTION OF THE PREFERRED EMBODIMENTS

Figure 1:
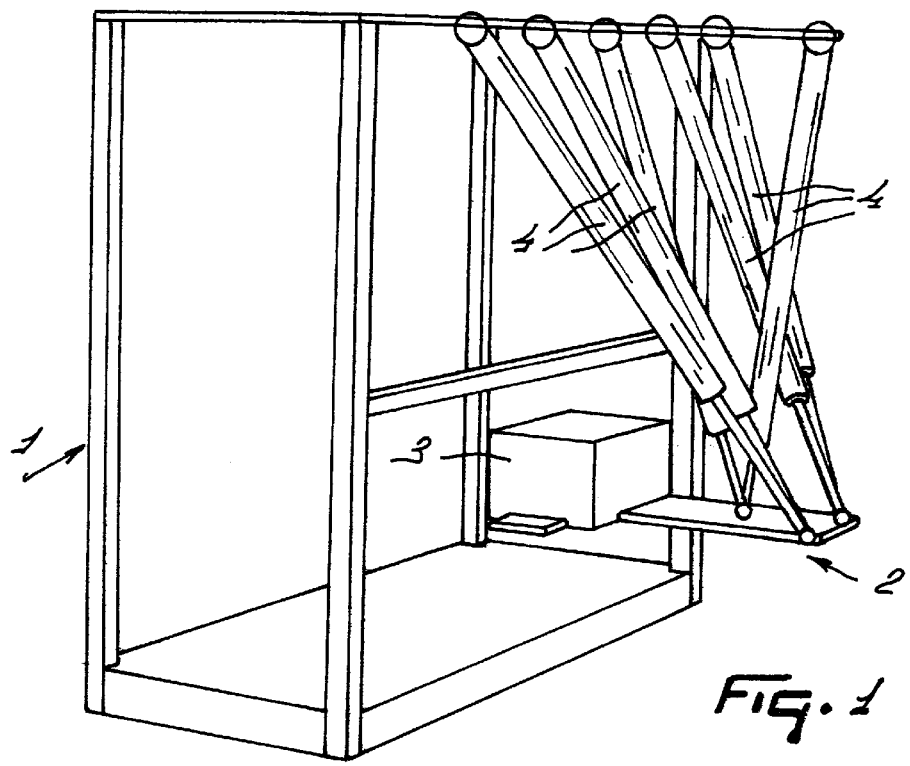
FIG. 1 shows schematically a perspective view of an apparatus according to the invention in a first position.
Figure 2:
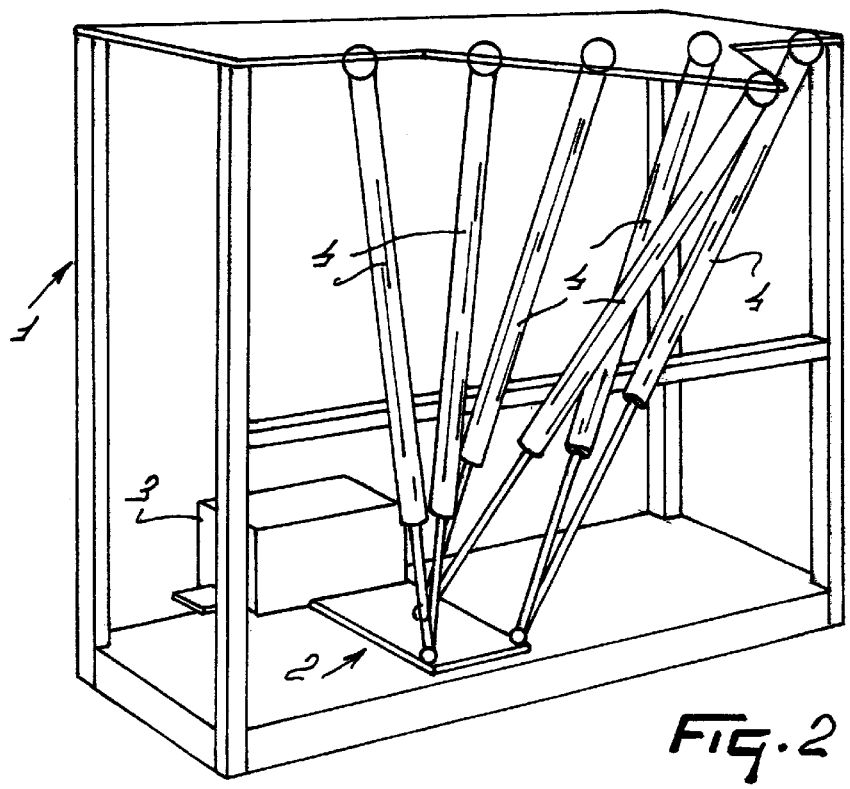
FIG. 2 shows schematically an apparatus of FIG. 1 in a further position.

FIG. 1 shows schematically an apparatus according to the invention in a first position. This apparatus for automatically milking animals comprises a milking compartment with milking robot 2 of a type well known those skilled in the art which is provided with teat cups and means for connecting the teat cups to the teats of an animal that enters milking compartment 1 to be milked. The teat cups are disposed on a schematically shown carrier element 3 that is movable in three dimensions by means of at least three controlled piston and cylinder elements 4, each of which has one end connected with the milking compartment.

There may further be provided means for spatial orientation of the carrier element 3. Said means comprise at least one further controlled piston and cylinder element 4 or at least one further controlled element, such as a stepper motor.

In the preferred embodiment, carrier element 3 is movable in three dimensions and capable of being orientated by means of six controlled piston cylinders elements 4, each of which has one end connected with milking compartment 1. Carrier element 3 has substantially three contact points (which are not in alignment with other) for the controlled piston and cylinder elements 4, each contact point being connected with two controlled piston and cylinder elements 4. Controlled piston and cylinder elements 4 are also fastened in pairs to carrier element 3 by means of a corresponding ball joint. Control piston and cylinder elements 4 are preferably suitable for moving carrier element 3 in a manner whereby it remains substantially parallel to the floor of milking compartment 1.

A part of carrier element 3, on which the teat cups are disposed, may be movable relative to a further part of carrier element 3, to which controlled piston and cylinder elements 4 are fastened. For that purpose carrier element 3 may be provided with a rotatable or a shiftable or a pivotable platform or a platform having any combination of such characteristics, for the teat cups. For the purpose of connecting the teat cups to the teats of the animal to be milked, carrier element 3 may also be provided with a lifting device for the teat cups. The means for connecting the teat cups to the teats of an animal being milked are preferably substantially disposed on the carrier element.

Although, we have disclosed the preferred embodiments of our invention, it is to be understood that it is capable of other adaptations and modifications within the scope of the following clams:

Having thus disclosed our invention, what we claim as new and to be secured by Letters Patent of the United States of America is:

1. A construction for automatically milking animals, said construction comprising a milk box (1) with a milking robot (2), which is provided with teat cups and with means for connecting the teat cups to the teats of an animal to be milked, characterized in that the teat cups are disposed on a carrier element (3) that is movable in three dimensions by means of at least three control cylinders (4), each of which having one end connected with the milk box (1).

2. A construction as claimed in claim 1, characterized in that the at least three control cylinders (4) are not disposed in one plane.

3. An apparatus for the automated milking of animals which comprises: a milking compartment for receiving an animal to be milked; a milking robot that is provided with teat cups and connecting means for connecting said teat cups to an animal in said milking compartment; a carrier element included in said milking robot, said teat cups being disposed on said carrier element; and at least three controlled piston and cylinder elements, each of said controlled piston and cylinder elements being connected on one end to said milking compartment and being linked on their respective opposite ends to said carrier element, whereby said carrier element is selectively movable by said controlled piston and cylinder elements in three dimensions.

4. An apparatus in accordance with claim 3 wherein said at least three controlled piston and cylinder elements are not all disposed in any single plane which also contains the longitudinal axis of any one of said at least three controlled piston and cylinder elements.

5. An apparatus in accordance with claim 3 which further comprises spatial orientation means for spatially orientating said carrier element.

6. An apparatus in accordance with claim 3 which comprises a further controlled piston and cylinder element.

7. An apparatus in accordance with claim 3 which comprises a further controlled element which is operatively associated with said at least three controlled piston and cylinder elements.

8. An apparatus in accordance with claim 7 wherein said further controlled element comprises a stepper motor.

9. An apparatus in accordance with claim 3 wherein said at least three controlled piston and cylinder elements comprises six controlled piston and cylinder elements.

10. An apparatus in accordance with claim 9 wherein said carrier element comprises three contact points, at least one of said contact points not being in alignment with the other two of said contact points, each of said contact points being connected with two of said six controlled piston and cylinder elements.

11. An apparatus in accordance with claim 3 wherein at least three ball joints mounted on said milking compartment, each of said controlled piston and cylinder elements being connected to a corresponding said ball joint.

12. An apparatus in accordance with claim 3 which comprises at least three ball joints mounted on said carrier element, each of said controlled piston and cylinder elements being separately connected to a corresponding one of said ball joints.

13. An apparatus in accordance with claim 3 wherein said carrier element is selectively movable by said at least three controlled piston and cylinder elements substantially parallel to an underlying floor milking compartment.

14. An apparatus in accordance with claim 3 wherein said teat cups are disposed on said carrier element so as to be movable relative to the remainder of said carrier element, said at least three controlled piston and cylinder elements being linked to said remainder of said carrier element.

15. An apparatus in accordance with claim 14 wherein said carrier element comprises a rotatable platform for said teat cups.

16. An apparatus in accordance with claim 14 wherein said carrier element comprises a shiftable platform for said teat cups.

17. An apparatus in accordance with claim 14 wherein said carrier element comprises a platform for said teat cups which is pivotable.

18. An apparatus in accordance with claim 14 wherein said carrier element comprises a platform for said teat cups, said platform consisting of rotatable means or shiftable means or pivotable means or any combination thereof.

19. An apparatus in accordance with claim 3 wherein said carrier element comprises a lifting device for said teat cups.

20. An apparatus in accordance with claim 3 wherein said carrier element comprises means for connecting said teat cups to an animal being milked in said milking compartment.

21. An apparatus for automated milking of animals which comprises: a milking compartment for receiving an animal to be milked; a milking robot that is provided with teat cups and connecting means for connecting said teat cups to an animal in said milking compartment; a carrier element included in said milking robot, said teat cups being disposed on said carrier element; and at least three sets of controlled piston and cylinder elements, each of said sets being connected on one end to said milking compartment and being connected on their opposite respective ends to said carrier element, whereby said carrier element is selectively movable by said sets in three dimensions and substantially parallel to a floor that underlies said milking compartment.

* * * * *